United States Patent
Buxton et al.

[11] Patent Number: 5,742,832
[45] Date of Patent: Apr. 21, 1998

[54] COMPUTER SYSTEM WITH PROGRAMMABLE DRIVER OUTPUT'S STRENGTHS RESPONSIVE TO CONTROL SIGNAL MATCHING PREASSIGNED ADDRESS RANGE

[75] Inventors: Clark L. Buxton, Austin; Keith G. Hawkins, Dripping Springs, both of Tex.

[73] Assignee: Advanced Micro Devices, Sunnyvale, Calif.

[21] Appl. No.: 599,615

[22] Filed: Feb. 9, 1996

[51] Int. Cl.⁶ ............................. G06F 1/32; H03K 17/04
[52] U.S. Cl. ............................. 395/750; 395/309; 326/26; 326/62
[58] Field of Search ............................. 395/750, 280, 395/309; 327/108, 165, 378; 326/17, 21, 22, 29, 30, 31, 62, 82, 86, 90, 26

[56] References Cited

U.S. PATENT DOCUMENTS

| | | | |
|---|---|---|---|
| 4,291,242 | 9/1981 | Schriber | 326/98 |
| 4,810,908 | 3/1989 | Suzuki et al. | 327/306 |
| 4,816,700 | 3/1989 | Imel | 327/154 |
| 4,851,717 | 7/1989 | Yabe | 326/41 |
| 4,866,310 | 9/1989 | Ando et al. | 326/93 |
| 4,922,136 | 5/1990 | Ueda | 326/41 |
| 4,929,854 | 5/1990 | Iino et al. | 327/297 |
| 4,965,471 | 10/1990 | Gaboury | 326/84 |
| 4,970,405 | 11/1990 | Hagiwara | 327/145 |
| 5,001,731 | 3/1991 | Atwell, Jr. et al. | 375/356 |
| 5,003,205 | 3/1991 | Kohda et al. | 326/81 |
| 5,013,942 | 5/1991 | Nishimura et al. | 327/297 |
| 5,023,843 | 6/1991 | Love | 365/222 |
| 5,029,279 | 7/1991 | Sasaki et al. | 327/292 |
| 5,039,874 | 8/1991 | Anderson | 327/109 |
| 5,045,725 | 9/1991 | Sasaki et al. | 326/37 |
| 5,058,132 | 10/1991 | Li | 375/260 |
| 5,073,730 | 12/1991 | Hoffman | 326/86 |
| 5,077,676 | 12/1991 | Johnson et al. | 364/489 |
| 5,079,440 | 1/1992 | Roberts et al. | 327/155 |
| 5,153,450 | 10/1992 | Ruetz | 326/87 |
| 5,153,457 | 10/1992 | Martin et al. | 326/84 |
| 5,285,116 | 2/1994 | Thaik | 326/21 |
| 5,293,082 | 3/1994 | Bathaee | 327/108 |
| 5,315,172 | 5/1994 | Reddy | 326/27 |
| 5,349,666 | 9/1994 | Adachi et al. | 395/750 |
| 5,444,406 | 8/1995 | Horne | 327/277 |
| 5,461,330 | 10/1995 | Gist et al. | 326/17 |
| 5,522,081 | 5/1996 | Carls | 395/750 |
| 5,539,341 | 7/1996 | Kuo | 327/108 |
| 5,561,792 | 10/1996 | Ganapathy | 395/550 |

FOREIGN PATENT DOCUMENTS 890254275   9/1989   Japan .

*Primary Examiner*—Dinh G. Dung
*Attorney, Agent, or Firm*—Conley, Rose & Tayon; B. Noel Kivlin

[57] ABSTRACT

A computer system is presented which includes an output driver circuit with a drive strength that varies depending upon the speed of a peripheral device being accessed, the frequency of a system clock signal, and/or the system configuration. Reducing drive strength when a slow peripheral device is being accessed, the frequency of the system clock signal is reduced, or bus loading is low reduces the occurrence of large switching transients and accompanying ground bounce, power supply droop, and radiated EMI. A power management unit produces a clock frequency control signal which controls the frequency of the system clock. In one embodiment, the output driver circuit includes an address storage unit, an address comparator unit, a bus loading storage unit, a control unit, and one or more adjustable drive circuits having an output terminal coupled to a signal line of a peripheral bus. The address storage unit stores address range information associated with one or more peripheral devices coupled to the peripheral bus. The address comparator unit produces an address match signal if an address signal is within a range of addresses identified by address range information stored in the address storage unit. The bus loading unit stores peripheral bus loading information. The control unit produces one or more control signals dependent upon the address match signal, the clock frequency control signal, and/or bus loading information. Each adjustable drive circuit drives the output terminal with a drive strength determined by the one or more control signals.

20 Claims, 4 Drawing Sheets

5,742,832

COMPUTER SYSTEM WITH PROGRAMMABLE DRIVER OUTPUT'S STRENGTHS RESPONSIVE TO CONTROL SIGNAL MATCHING PREASSIGNED ADDRESS RANGE

BACKGROUND OF THE INVENTION

1. Field of the Invention

This invention relates to computer systems and more particularly to a computer system having dynamically adjustable output driver circuits with variable drive strengths.

2. Description of the Relevant Art

In a typical computer system, a central processing unit (CPU) communicates with memory and input/output peripheral devices via signals driven on signal lines of buses. Output drivers establish predetermined voltage levels, associated with digital logic levels, on bus signal lines. A transition from a lower voltage level to a higher voltage level on a signal line has an associated "rise time," and a transition from a higher voltage level to a lower voltage level has an associated "fall time." The voltage level of a signal line must stabilize before a receiving device may correctly receive the communicated signal.

Output drivers of sending devices must thus be capable of establishing voltage levels on signal lines of buses in finite amounts of time. The two factors which largely determine the speed at which an output driver can affect a voltage transition on a signal line are 1) the strength of the output driver (i.e., the current sourcing and sinking ability of the output driver), and 2) the capacitive loading associated with the signal line. An output driver connected to a signal line with a large capacitive load must have a relatively large drive strength to provide output signals with fast rise and fall times. Capacitive loading of a signal line generally increases with the number of devices connected to it.

One of the many issues involved in the design of a computer system is the establishment of maximum allowable rise and fall times for signals driven on signal lines of a bus. Relatively long signal transition times increase the amount of time required for signal voltages to stabilize, increasing the amount of time which must be allowed for the completion of a given bus cycle.

On the other hand, very short signal transition times require large switching transient currents in order to charge and discharge capacitive loads quickly. The impedances of conductors carrying these large transient currents result in voltage transients. Such voltage transients result in ground "bounce," power supply "droop," and reduced noise margins of logic devices connected to these conductors. These voltage transients have significant high frequency components, and may be coupled into other conductors located nearby. The high frequency components of these transient voltages also increase the levels of radiated electro-magnetic interference (EMI).

Peripheral devices coupled to a bus typically have varying access times. Devices with short access times require input signals with fast signal transitions (i.e., short rise and fall times). Other devices coupled to the same bus may have longer access times, and may not require fast signal transitions. Output drivers must be capable of communicating with all devices coupled to the bus, however, necessitating increased drive strength to force faster signal transitions required by devices with short access times.

In addition, decoupling a peripheral device from a bus reduces the capacitive loading of signal lines to which the peripheral device was previously connected. Output drivers associated with these signal lines may now have excessive drive strength for the resulting reduced capacitive loading. Very short signal transition times may result, accompanied by the problems associated with very short signal transitions.

A computer system including an output driver circuit with programmable drive strengths depending upon system configuration would allow the drive strength of the output driver to be reduced when a relatively slow device is accessed, when clock frequencies are reduced (i.e., bus cycle times are extended), or when one or more devices are decoupled from a bus. As a result, many of the problems associated with very short signal transition times would be significantly reduced.

SUMMARY OF THE INVENTION

The problems outlined above are in large part solved by a computer system including an output driver circuit with a drive strength that varies depending upon the speed of the device being accessed, the frequency of the system clock, and/or the system configuration. A power management unit monitors one or more signal lines of the computer system and reduces the frequency of the system clock signal during periods of reduced system activity. The power management unit produces a clock frequency control signal which controls the frequency of the system clock. In one embodiment, the output driver circuit includes an address storage unit, an address comparator unit, a bus loading storage unit, a control unit, and one or more adjustable drive circuits with outputs coupled to signal lines of a peripheral bus. The address storage unit includes one or more storage locations for address range information associated with peripheral devices coupled to the peripheral bus. The address storage unit provides stored address range information to the address comparator unit, which produces an address match signal if an address signal is within a range of addresses identified by the address range information. The bus loading unit includes one or more storage locations for bus loading information indicative of the capacitive loading on signal lines of the peripheral bus.

The output driver circuit includes one or more adjustable drive circuits, preferably one for each peripheral bus line driven by the output driver circuit. Each adjustable drive circuit of the output driver circuit includes two or more tri-state output drivers which may be enabled independently by the control unit. An input terminal of each adjustable drive circuit is coupled to receive an input signal. An output terminal of each adjustable drive circuit is coupled to a signal line of the peripheral bus. The control unit uses the address match signal produced by the address comparator circuit (i.e., device speed information), the clock frequency control signal produced by the power management unit, and/or bus loading information provided by the bus loading storage unit to produce one or more control signals which enable the tri-state output drivers of the adjustable drive circuits. Drive strengths of the adjustable drive circuits may be reduced when a slow peripheral device is being accessed, the frequency of the system clock signal is reduced, or bus loading is low. Reducing the drive strengths of the adjustable drive circuits when possible reduces the occurrence of large switching transients and the accompanying ground bounce, power supply droop, and radiated EMI.

BRIEF DESCRIPTION OF THE DRAWINGS

Other objects and advantages of the invention will become apparent upon reading the following detailed description and upon reference to the accompanying drawings in which.

Figure 1:
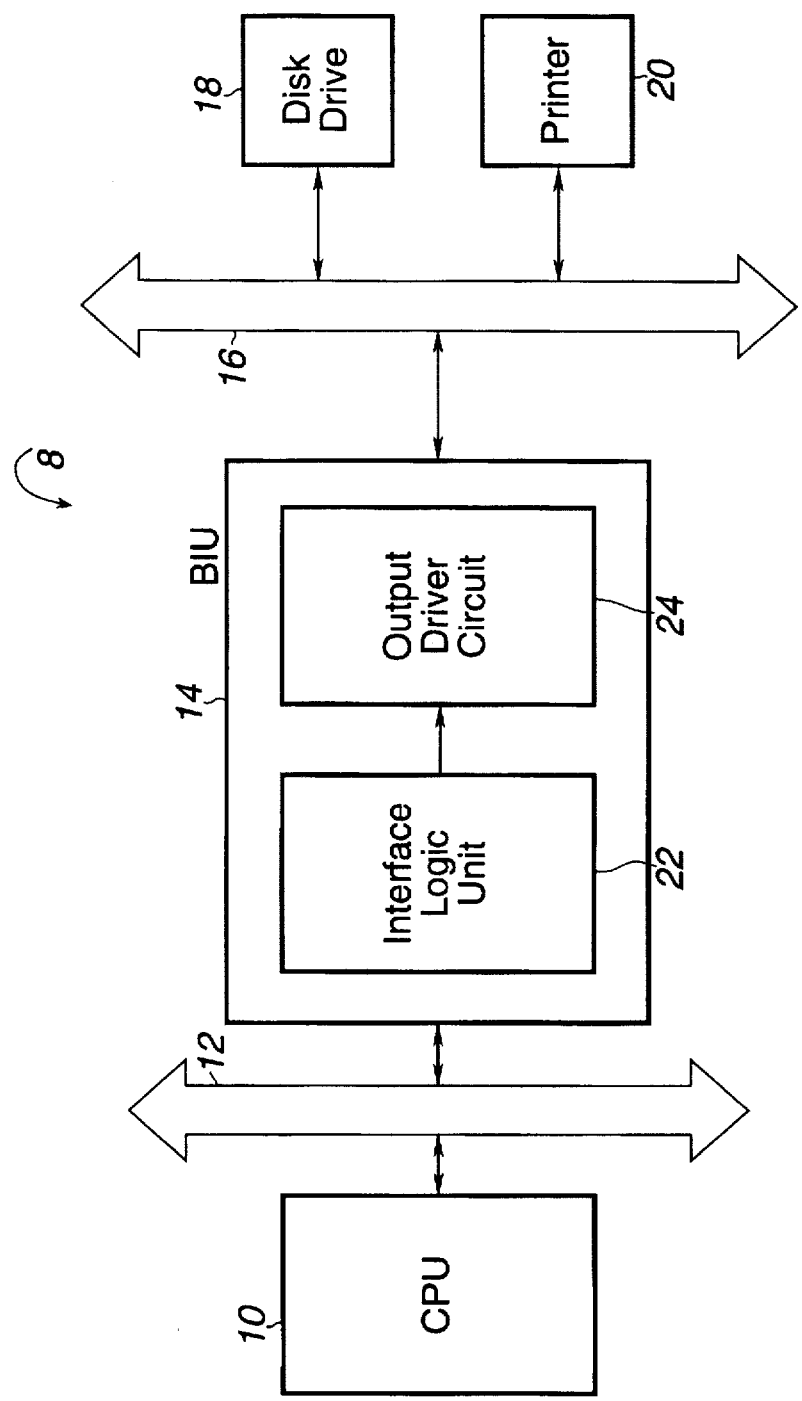
FIG. 1 is a block diagram of a computer system including an output driver circuit with variable drive strength in accordance with one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 is a block diagram of a computer system 8 including an output driver circuit in accordance with one embodiment of the present invention. A CPU 10 is coupled to a processor bus 12. A bus interface unit (BIU) 14 is coupled between processor bus 12 and a local expansion bus 16. Local expansion bus 16 may be an Industry Standard Architecture (ISA) bus, an Enhanced ISA (EISA) bus, a Micro Channel Architecture (MCA) bus, a memory interface bus, or a Personal Computer Memory Card International Association (PCMCIA) peripheral card bus. A disk drive 18 and a printer 20 are coupled to local expansion bus 16.

An interface logic unit 22 of BIU 14 performs protocol translations to accommodate transfers of address, data, and control signals from processor bus 12 to local expansion bus 16. An output driver circuit 24, associated with local expansion bus 16, includes one or more output drivers with variable drive strength. As will be described in detail below, output driver circuit 24 may use information about (i) the relative speed of a peripheral device being accessed, (ii) the frequency of the system clock signal, and/or (iii) loading information associated with local expansion bus 16 to determine the amount of drive strength required when driving signals onto local expansion bus 16. It is understood that BIU 14 may also include an interface logic unit and output driver circuit (not shown) to accommodate signal transfers from local expansion bus 16 to processor bus 12.

Figure 2:
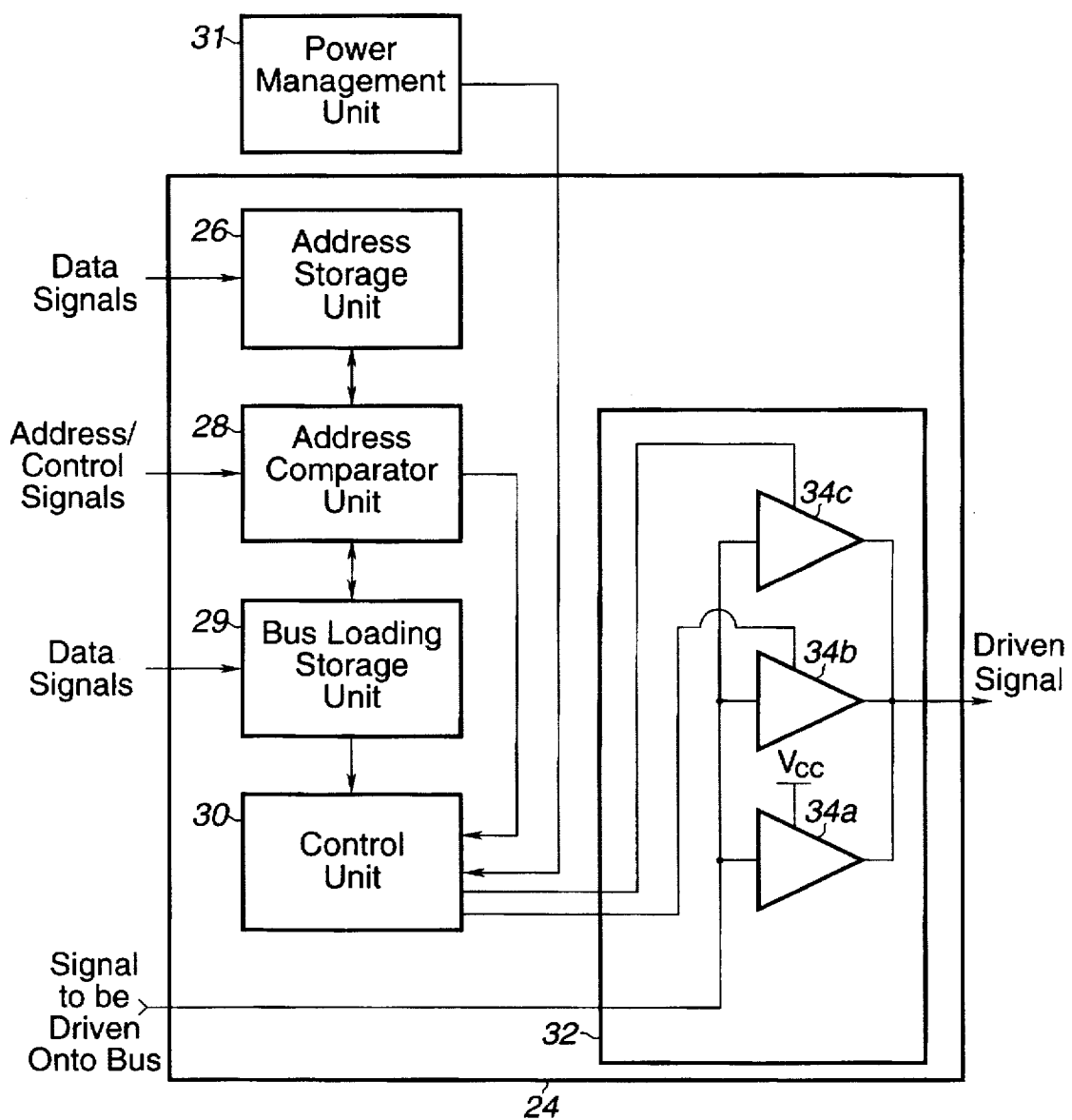
FIG. 2 is a block diagram of one embodiment of the output driver circuit.

FIG. 2 is a block diagram of one embodiment of output driver circuit 24. An address storage unit 26 is coupled to receive data signals produced by interface logic unit 22, and is coupled to an address comparator unit 28. Address comparator unit 28 is coupled to receive address and control signals produced by interface logic unit 22, and is coupled to a bus loading storage unit 29 and to a control unit 30. Bus loading storage unit 29 is coupled to receive data signals produced by interface logic unit 22, and is coupled to control unit 30. A power management unit 31, external to output driver circuit 24, is also coupled to control unit 30. Control unit 30 is coupled to one or more adjustable drive circuits 32. Each adjustable drive circuit 32 drives an input signal from interface logic unit 22 onto a signal line of local expansion bus 16. One adjustable drive circuit 32 is preferably provided for each signal line of local expansion bus 16 that is driven by BIU 24.

Address storage unit 26 is coupled to receive data signals produced by interface logic unit 22 and configured to store address range information associated with one or more peripheral devices coupled to local expansion bus 16. Address range information stored in address storage unit 26 preferably pertains to peripheral devices having relatively short access times (i.e., fast devices). Address range information associated with a peripheral device may include a high address and a low address assigned to a given peripheral device, the address information thus defining a range of addresses assigned to the peripheral device.

Peripheral device address range information may be transferred to address storage unit 26 during initialization of computer system 8, and may be updated during operation of computer system 8 as peripheral devices are coupled and decoupled from local expansion bus 16. A list of peripheral devices connected to local expansion bus 16 may be maintained by an operating system of computer system 8. An automatic detection mechanism, implemented in hardware or software, may be employed to periodically update the list. The list of peripheral devices coupled to local expansion bus 16 may be used to obtain address range information to be stored in address storage unit 26.

Address comparator unit 28 is coupled to receive address and control signals produced by interface logic unit 22. Address comparator unit 28 is configured to produce an address match signal which is asserted if an address signal is within a range of addresses identified by address information stored in address storage unit 26. Additionally, address comparator unit 28 controls the storage of address range information and bus loading information into address storage unit 26 and bus loading storage unit 29.

Upon receiving control signals associated with a peripheral device access, address comparator unit 28 compares the address signals produced by interface logic unit 22 during the access to the address range information stored in address storage unit 26. Address comparator unit 28 is configured to produce an address match signal which is asserted (i.e., a logic value of 1 for positive logic, or a logic value of 0 for negative logic) if the address signals produced by interface logic unit 22 correspond to an address within the ranges of addresses indicated by the address information stored in address storage unit 26. Thus, the output address match signal is asserted if the address signals produced by interface logic unit 22 correspond to an address assigned to a fast peripheral device coupled to local expansion bus 16. The address match signal is deasserted if the address signals correspond to an address which is not within a range of addresses indicated by address information stored in address storage unit 26.

It is noted that, in another embodiment, address comparator unit 28 may receive "hard-wired" address range information associated with a peripheral device rather than address range information transferred to and stored in address storage unit 26 as described above. In this embodiment, address comparator unit 28 produces an address match signal which is asserted if a received address signal is within a range of "hard-wired" addresses associated with the peripheral device.

Bus loading storage unit 29 is coupled to receive data signals produced by interface logic unit 22 and configured to store bus loading information (i.e., capacitive loading information) associated with local expansion bus 16. Bus loading storage unit 29 is also configured to continuously provide the bus loading information to control unit 30. Bus loading information may be an integer value reflecting the number of peripheral devices coupled to local expansion bus 16. Bus loading information may be transferred to bus loading storage unit 29 during initialization of computer system 8, and may be updated during operation of computer system 8 as peripheral devices are coupled and decoupled from local expansion bus 16. The list of peripheral devices coupled to local expansion bus 16 described above may be 20 used to modify the bus loading information stored in bus loading unit 29.

Power management unit 31 is coupled to various signal lines within computer system 8 and configured to produce a clock frequency control signal. When the level of activity within computer system 8 is high, power management unit 31 may assert the clock frequency control signal. The asserted clock frequency control signal causes a clock generator circuit (not shown) within computer system 8 to generate a system clock signal corresponding to a maximum operational speed of computer system 8. During periods of low system activity, power management unit 31 deasserts the clock frequency control signal, causing the clock generator circuit to reduce the frequency of the system clock signal in order to reduce system power dissipation.

Each adjustable drive circuit 32 of output driver circuit 24 includes two or more tri-state output drivers. Each tri-state output driver is enabled independently by control unit 30. In the embodiment of FIG. 2, each adjustable drive circuit 32 is composed of three tri-state output drivers 34a, 34b, and 34c. Each tri-state output driver has an input terminal, a control terminal, and an output terminal. A tri-state output driver is enabled when a control signal coupled to the control terminal of the tri-state output driver is asserted, and is disabled when the control signal is deasserted. The control terminals of tri-state output drivers 34b and 34c are coupled to receive control signals produced by control unit 30. The control terminal of tri-state output driver 34a is connected to the power supply voltage ($V_{cc}$), thus tri-state output driver 34a is always enabled. It is understood that in other embodiments tri-state output driver 34a may be also be coupled to receive a control signal produced by control unit 30. This would allow more than one bus master to drive signals onto local expansion bus 16.

When enabled, the output terminal of a tri-state output driver is driven with a voltage representing the logic level of a signal line coupled to the input terminal. When disabled, the output terminal of the tri-state output driver is not driven, and is allowed to "float." In the embodiment of FIG. 2, the drive strength of tri-state output driver 34a is preferably less than or equal to the drive strength of tri-state output driver 34b, and the drive strength of tri-state output driver 34b is preferably less than or equal to the drive strength of tri-state output driver 34c.

The input terminals of all tri-state output drivers included in each adjustable drive circuit 32 are coupled to an input terminal of adjustable drive circuit 32, and the output terminals of all tri-state output drivers included in each adjustable drive circuit 32 are coupled to an output terminal of adjustable drive circuit 32. In FIG. 2, the input terminal of adjustable drive circuit 32 is coupled to receive a signal produced by interface logic unit 22 which is to be driven on a signal line of local expansion bus 16. The output terminal of adjustable drive circuit 32 is coupled to the corresponding signal line of local expansion bus 16.

In general, control unit 30 produces one or more control signals coupled to the control terminals of one or more tri-state drivers within adjustable driver circuit 32. In the embodiment of FIG. 2, control unit 30 produces two control signals coupled to the control terminals of tri-state output drivers 34b and 34c. Control unit 30 is coupled to receive the address match signal produced by address comparator unit 28, the clock frequency control signal provided by power management unit 31, and bus loading information provided by bus loading storage unit 29, and may use one or more of these signals to produce the two output control signals. Disabling tri-state output drivers when possible reduces the occurrence of large switching transients, along with the accompanying ground bounce, power supply droop, and radiated EMI.

An example of one embodiment of control unit 30 using positive logic is described by the truth table of Table 1 below. Address information associated with one or more fast peripheral devices is stored in address storage unit 26. Signal CF is the value of the clock frequency control signal produced by power management unit 31 (1=high, 0=low). Signal AM is the address match signal produced by address comparator unit 28 (1=match, 0=no match). Thus when signal AM has a value of 1, a fast peripheral device coupled to local expansion bus 16 is being accessed. Signal LD is the bus loading information provided by bus loading storage unit 29 (1=high loading, 0=low loading). Signal EB is the logical output of control unit 30 coupled to the control terminal of tri-state output driver generated 34b, and signal EC is the logical output of control unit 30 coupled to the control terminal of tri-state output driver generated 34c.

TABLE 1

| Truth Table for Control unit 30. | | | | |
|---|---|---|---|---|
| CF | AM | LD | EB | EC |
| 0 | 0 | 0 | 0 | 0 |
| 0 | 0 | 1 | 0 | 0 |
| 0 | 1 | 0 | 0 | 0 |
| 0 | 1 | 1 | 1 | 0 |
| 1 | 0 | 0 | 1 | 0 |
| 1 | 0 | 1 | 1 | 0 |
| 1 | 1 | 0 | 1 | 0 |
| 1 | 1 | 1 | 1 | 1 |

Tri-state output driver 34a is the only tri-state output driver enabled when the frequency of the system clock signal is low and (i) a slow device is being accessed, or (ii) bus loading is low. Fast signal transitions are not required, and transients resulting from fast signal transitions are reduced. For example, in the computer system of FIG. 1, when the system clock speed is slow and CPU 10 sends data to a relatively slow printer 20, tri-state output driver 34a is the only tri-state output driver enabled. Tri-state output driver 34a is also the only tri-state output driver enabled when the frequency of the system clock is low, relatively fast disk drive 18 is being accessed, and bus loading associated with local expansion bus 16 is low.

Tri-state output driver 34b is enabled when the system clock frequency is high, or when a fast device is being accessed and bus loading is high. Each adjustable drive circuit 32 thus has the drive strength of tri-state output drivers 34a and 34b combined, resulting in faster signal transitions on the corresponding signal lines of local expansion bus 16. For example, in the computer system of FIG. 1, tri-state output drivers 34a and 34b are both enabled when the frequency of the system clock is high and relatively slow printer 20 is being accessed. Tri-state output drivers 34a and 34b are also enabled when the system clock frequency is low, relatively fast disk drive 18 is being accessed, and bus loading associated with local expansion bus 16 is high.

Tri-state output driver 34c is enabled only when the system clock frequency is high, a relatively fast device is being accessed, and bus loading is high. Each adjustable drive circuit 32 thus has the drive strength of tri-state output drivers 34a, 34b, and 34c combined, resulting in the fastest signal transitions possible on the corresponding signal lines of local expansion bus 16. For example, in the computer system of FIG. 1, tri-state output drivers 34a, 34b, and 34c are all enabled when the system clock frequency is high, relatively fast disk drive 18 is being accessed, and bus loading associated with local expansion bus 16 is high.

Figure 3:
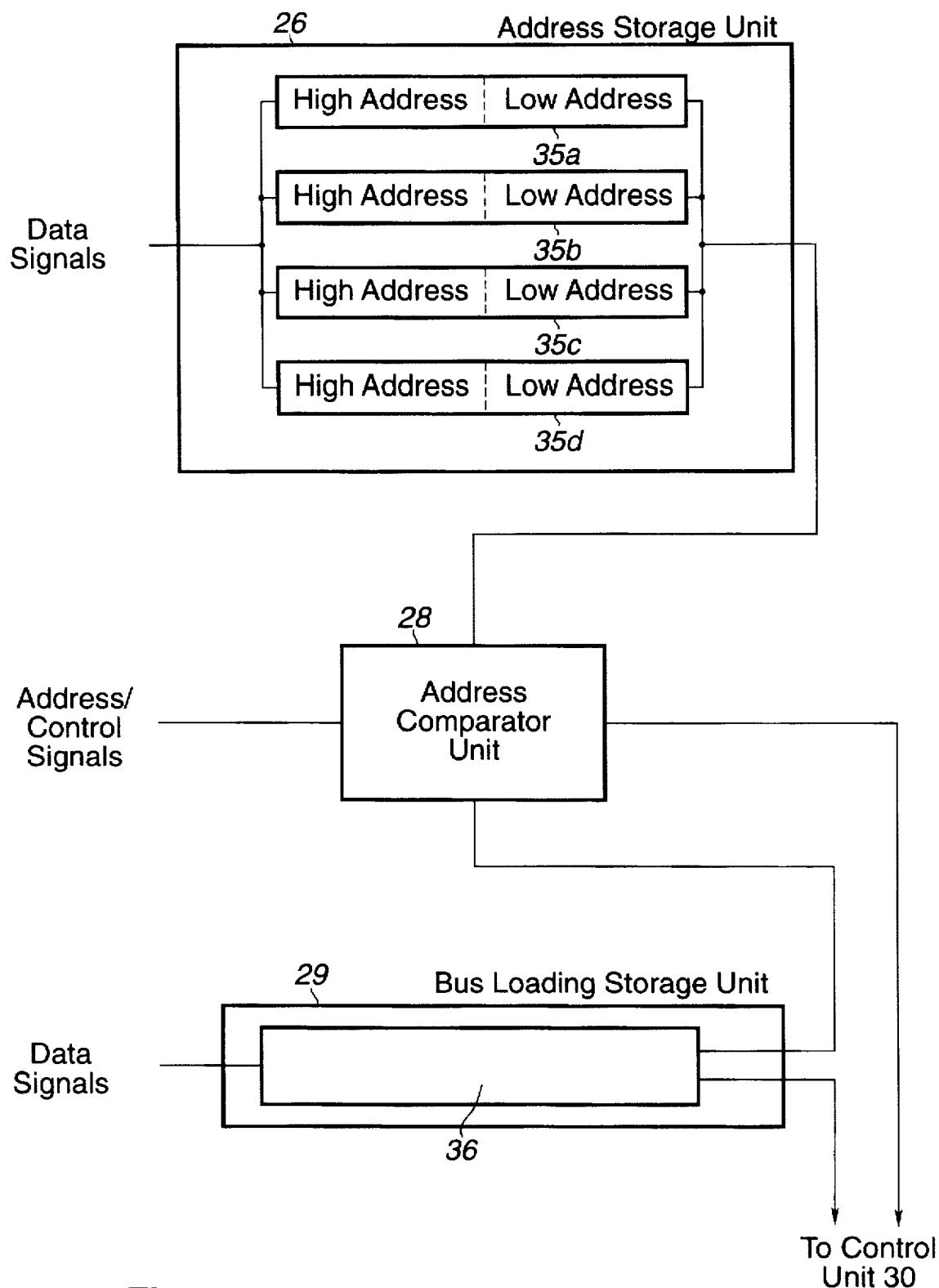
FIG. 3 is a block diagram of exemplary embodiments of an address storage unit and a bus loading storage unit of the output driver circuit.

FIG. 3 is a block diagram of embodiments of address storage unit 26 and bus loading storage unit 29. Address storage unit 26 includes four storage locations 35a–d. Each storage location is made up of one or more memory cells capable of storing a single binary digital value. Suitable memory cells include static and dynamic random access memory cells, registers, and latch structures. Each storage location is configured to store a high address and a low address associated with a peripheral device coupled to local expansion bus 16. Each storage location 35a–d has a write-only port coupled to data signals produced by interface logic unit 22 and a read-only port coupled to address comparator unit 28. Each storage location is also coupled to address comparator unit 28 via one or more control lines.

Bus loading storage unit 29 includes a single storage location 36. The storage location is configured to store a value indicative of the capacitive loading upon local expansion bus 16. Storage location 36 has a write-only port coupled to data signals produced by interface logic unit 22, a read-only port coupled to control unit 30, and is coupled to address comparator unit 28 via one or more control lines. The read-only port is continuously driven with the bus loading information stored in storage location 36.

Figure 4:
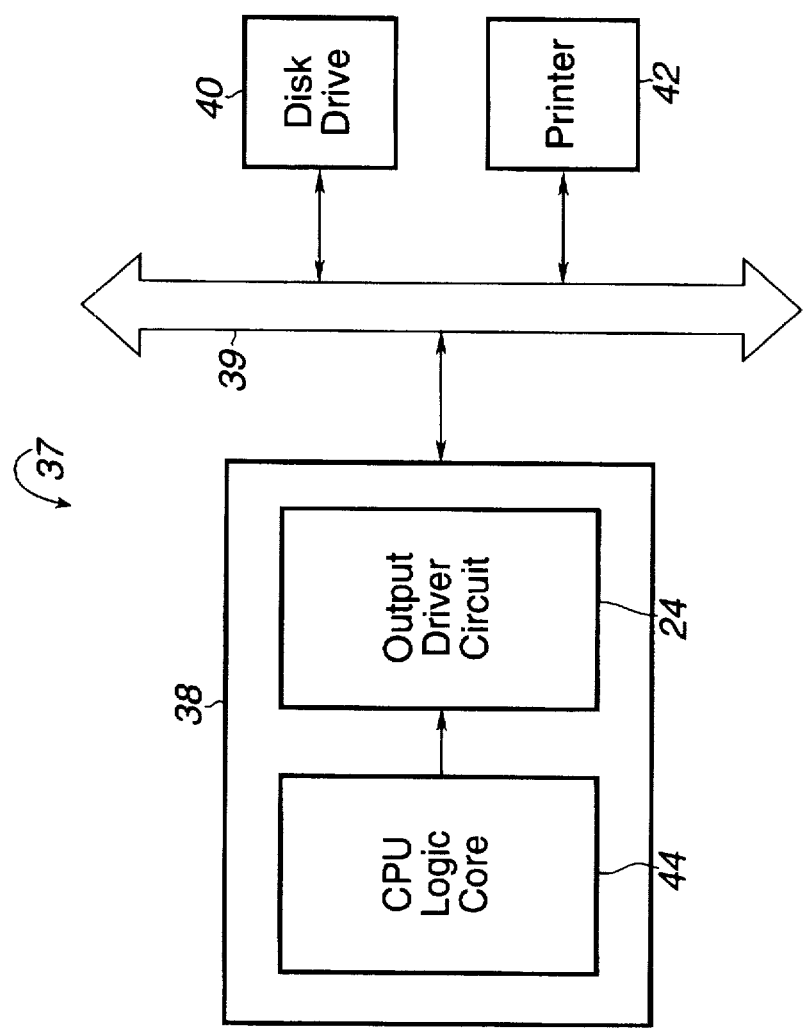
FIG. 4 is a block diagram of a computer system including an output driver circuit with variable drive strength in accordance with a second embodiment of the present invention.

FIG. 4 is a block diagram of a computer system 37 including an output driver circuit 24 according to a second embodiment of the present invention. A microprocessor 38 is coupled to a system bus 39. A disk drive 40 and a printer 42 are coupled to system bus 39.

Microprocessor 38 includes a CPU logic core 44, and an output driver circuit 24 as described above. Output driver circuit 24 is coupled to receive address, data, and control signals generated by CPU logic core 44. Output driver circuit 24 is similar to the output driver circuit described above in connection with the embodiment of FIG. 1. Output driver circuit 24 includes one or more adjustable drive circuits 32 (FIG. 2), preferably one for each signal to be driven upon system bus 39. The input terminal of each adjustable drive circuit is coupled to receive a signal produced by CPU logic core 44. The output terminal of each adjustable drive circuit is coupled to a signal line of system bus 39. The drive strength of each adjustable drive circuit may thus be reduced when possible in order to reduce the occurrence of large switching transients and the accompanying ground bounce, power supply droop, and radiated EMI.

Numerous variations and modifications will become apparent to those skilled in the art once the above disclosure is fully appreciated. It is intended that the following claims be interpreted to embrace all such variations and modifications.

What is claimed is:

1. A computer system comprising an output driver circuit, wherein said output driver circuit comprises:

an address storage unit configured to store address range information identifying an address range associated with a peripheral device;

an address comparator unit coupled to receive the address range information from the address storage unit and to receive an address signal from a first bus, wherein the address comparator unit is configured to produce an address match signal indicating whether or not said address signal is included within said address range information;

a control unit coupled to receive the address match signal produced by the address comparator unit and configured to produce a control signal dependent upon said address match signal; and an adjustable drive circuit including a control line coupled to receive said control signal from said control unit, wherein the drive strength of said adjustable drive circuit is dependent upon said control signal.

2. The computer system as recited in claim 1, further comprising a power management unit configured to produce a clock frequency control signal to control the frequency of a system clock signal, and wherein the control unit is (i) coupled to receive the clock frequency control signal as well as the address match signal produced by the address comparator unit, and (ii) configured to produce a control signal dependent upon said clock frequency control signal and said address match signal.

3. The computer system as recited in claim 1, further comprising a bus loading storage unit coupled to the first bus and configured to store bus loading information, and wherein the control unit is (i) coupled to receive the bus loading information from the bus loading storage unit as well as the address match signal produced by the address comparator unit, and (ii) configured to produce a control signal dependent upon said bus loading information and said address match signal.

4. The computer system as recited in claim 1, wherein the adjustable drive circuit includes a plurality of tri-state output drivers coupled in parallel between an input terminal of the adjustable drive circuit and an output terminal of the adjustable drive circuit.

5. The computer system as recited in claim 4, wherein each tri-state output driver comprises an input terminal, an output terminal, and a control terminal, and wherein the input terminal of each tri-state output driver is coupled to the input terminal of the adjustable drive circuit, and the output terminal of each tri-state output driver is coupled to the output terminal of the adjustable drive circuit.

6. The computer system as recited in claim 5, wherein the control terminal of at least one tri-state output driver is coupled to the control line of the adjustable drive circuit.

7. The computer system as recited in claim 4, wherein the output terminal of the adjustable drive circuit is coupled to a signal line of a second bus.

8. The computer system as recited in claim 7, wherein the address storage unit comprises at least one storage location configured to store a high address value and a low address value associated with a peripheral device coupled to the second bus.

9. The computer system as recited in claim 7, wherein the bus loading storage unit comprises a storage location configured to store an integer value equal to the number of peripheral devices coupled to the second bus.

10. A computer system, comprising:

a CPU coupled to a processor bus;

a local expansion bus configured to couple a peripheral device to the computer system;

a bus interface unit coupled between the processor bus and the local expansion bus, comprising:

an interface logic unit coupled to the processor bus and configured to perform protocol translations to accommodate transfers of address, data, and control signals from the processor bus to the local expansion bus;

an output driver circuit coupled to the interface logic unit and to the local expansion bus, comprising:
  an address storage unit coupled to receive address range information from the interface logic unit and configured to store said address range information, wherein said address range information identifies an address range associated with a peripheral device coupled to the local expansion bus;
  an address comparator unit coupled to receive the address range information from the address storage unit and to receive an address signal from the interface logic unit, wherein said address comparator unit is configured to produce an address match signal indicating whether or not said address signal is included within said address range information;
  a control unit coupled to receive the address match signal produced by the address comparator unit and configured to produce a control signal dependent upon said address match signal; and
  an adjustable drive circuit having an input terminal coupled to receive an input signal produced by the interface logic unit, a control line coupled to receive the control signal produced by the control unit, and an output terminal coupled to a signal line of the local expansion bus, wherein the drive strength of said adjustable drive circuit is dependent upon said control signal.

11. The computer system as recited in claim 10, further comprising a power management unit configured to produce a clock frequency control signal to control the frequency of a system clock signal, and wherein the control unit is (i) coupled to receive the clock frequency control signal as well as the address match signal produced by the address comparator unit, and (ii) configured to produce a control signal dependent upon said clock frequency control signal and said address match signal.

12. The computer system as recited in claim 10, further comprising a bus loading storage unit coupled to receive bus loading information from the interface logic unit and configured to store said bus loading information, and wherein the control unit is (i) coupled to receive the bus loading information from the bus loading storage unit as well as the address match signal produced by the address comparator unit, and (ii) configured to produce a control signal dependent upon said bus loading information and said address match signal.

13. The computer system as recited in claim 10, wherein the adjustable drive circuit includes a plurality of tri-state output drivers coupled in parallel between the input terminal and the output terminal of the adjustable drive circuit.

14. A computer system comprising an output driver circuit, wherein said output driver circuit comprises:
  an address comparator unit coupled to receive an address signal from a first bus and configured to produce an address match signal if said address signal is within a range of addresses associated with a peripheral device;
  a control unit coupled to receive the address match signal produced by the address comparator unit and configured to produce a control signal dependent upon said address match signal; and
  an adjustable drive circuit including a control line coupled to receive said control signal from said control unit, wherein the drive strength of said adjustable drive circuit is dependent upon said control signal.

15. The computer system as recited in claim 14, wherein the adjustable drive circuit includes a plurality of tri-state output drivers coupled in parallel between an input terminal of the adjustable drive circuit and an output terminal of the adjustable drive circuit.

16. The computer system as recited in claim 15, wherein the output terminal of the adjustable drive circuit is coupled to a signal line of a second bus.

17. A computer system, comprising:
  a system bus configured to couple a peripheral device to the computer system; and
  a microprocessor coupled to the system bus, wherein said microprocessor comprises:
    a CPU logic core; and
    an output driver circuit coupled to the CPU logic core and to the system bus, comprising:
      an address storage unit coupled to receive address range information from the CPU logic core and configured to store said address range information, wherein said address range information identifies an address range associated with a peripheral device coupled to the system bus;
      an address comparator unit coupled to receive the address range information from the address storage unit and to receive an address signal from the CPU logic core, wherein said address comparator unit is configured to produce an address match signal indicating whether or not said address signal is included within said address range information;
      a control unit coupled to receive the address match signal produced by the address comparator unit and configured to produce a control signal dependent upon said address match signal; and
      an adjustable drive circuit having an input terminal coupled to receive an input signal produced by the CPU logic core, a control line coupled to receive the control signal produced by the control unit, and an output terminal coupled to a signal line of the system bus, wherein the drive strength of said adjustable drive circuit is dependent upon said control signal.

18. The computer system as recited in claim 17, further comprising a power management unit configured to produce a clock frequency control signal to control the frequency of a system clock signal, and wherein the control unit is (i) coupled to receive the clock frequency control signal as well as the address match signal produced by the address comparator unit, and (ii) configured to produce a control signal dependent upon said clock frequency control signal and said address match signal.

19. The computer system as recited in claim 17, further comprising a bus loading storage unit coupled to receive bus loading information from the CPU logic core and configured to store said bus loading information, and wherein the control unit is (i) coupled to receive the bus loading information from the bus loading storage unit as well as the address match signal produced by the address comparator unit, and (ii) configured to produce a control signal dependent upon said bus loading information and said address match signal.

20. The computer system as recited in claim 17, wherein the adjustable drive circuit includes a plurality of tri-state output drivers coupled in parallel between the input terminal and the output terminal of the adjustable drive circuit.

* * * * *